United States Patent
Song et al.

(10) Patent No.: US 8,811,560 B2
(45) Date of Patent: Aug. 19, 2014

(54) SYSTEM OF CONTROLLING STEAM GENERATOR LEVEL DURING MAIN FEED-WATER CONTROL VALVE TRANSFER FOR NUCLEAR POWER PLANT

(75) Inventors: Myung Jun Song, Daejeon (KR); Jong Joo Sohn, Daejeon (KR); In Ho Song, Daejeon (KR); Ju Han Lee, Daejeon (KR); Byung Heon Hwang, Daejeon (KR); Eun Kee Kim, Daejeon (KR); Ung Soo Kim, Daejeon (KR)

(73) Assignee: Kepco Engineering & Construction Company, Gyeonggi-do (KR)

( * ) Notice: Subject to any disclaimer, the term of this patent is extended or adjusted under 35 U.S.C. 154(b) by 605 days.

(21) Appl. No.: 12/981,869

(22) Filed: Dec. 30, 2010

(65) Prior Publication Data

US 2012/0170702 A1 Jul. 5, 2012

(30) Foreign Application Priority Data

Dec. 30, 2010 (KR) .................... 10-2010-0138442

(51) Int. Cl.
G21C 7/32 (2006.01)

(52) U.S. Cl.
USPC .......................................... 376/210

(58) Field of Classification Search
USPC .......................................... 376/210
See application file for complete search history.

(56) References Cited

U.S. PATENT DOCUMENTS

| 4,400,343 A | 8/1983 | Izumi et al. | |
| 4,445,180 A * | 4/1984 | Davis et al. | 700/289 |
| 4,777,009 A * | 10/1988 | Singh et al. | 376/211 |

FOREIGN PATENT DOCUMENTS

| CN | 1252607 A | 5/2000 |
| CN | 1577636 A | 2/2005 |
| JP | 06-281106 A | 10/1994 |
| KR | 1988-0000977 A | 3/1988 |
| KR | 1020010038807 A | 5/2001 |
| KR | 1020050003886 A | 1/2005 |
| KR | 1020050010328 A | 1/2005 |

OTHER PUBLICATIONS

KIPO NOA dated Sep. 11, 2012; Application No. 10-2010-0138442.
Chinese Notice of Non-Final Rejection dated Dec. 27, 2013; Appln. No. 201110036465.9.

* cited by examiner

Primary Examiner — Timothy A Brainard
(74) Attorney, Agent, or Firm — Ladas & Parry LLP (57) ABSTRACT

A system and a method of transforming a gain and an integral time constant of a proportional-integral (PI) controller according to a timer lapse time to relieve an excessive phenomenon of a steam generator level caused by rapid changes in open degrees of a downcomer feed-water valve and an economizer feed-water valve when reactor power transfers between low and high power sections. Accordingly, an excessive phenomenon of a steam generator level is relieved at a transfer time when reactor power transfers between low and high power sections. Therefore, a possibility of a stop of a reactor caused by the excessive phenomenon of the steam generator level is reduced to relieve burden on an operator and improve an operation rate and economic feasibility of a nuclear power plant.

4 Claims, 12 Drawing Sheets

| | DOWNCOMER FEED-WATER VALVE | ECONOMIZER FEED-WATER VALVE |
|---|---|---|
| LOW POWER SECTION (0~20%) | CONTROL TOTAL FEED-WATER FLOW TO BE SUPPLIED THROUGH DOWNCOMER ACCORDING TO FLOW DEMAND SIGNAL | COMPLETELY CLOSE ECONOMIZER FEED-WATER VALVE |
| HIGH POWER SECTION (20~100%) | CONTROL FEED-WATER FLOW CORRESPONDING TO 10% OF FEED-WATER FLOW IN 100% POWER OPERATION TO BE SUPPLIED THROUGH DOWNCOMER | CONTROL REMAINING FEED-WATER FLOW TO BE SUPPLIED THROUGH ECONOMIZER EXCEPT FOR FEED-WATER FLOW OF TOTAL FEED-WATER FLOW SUPPLIED THROUGH DOWNCOMER ACCORDING TO FLOW DEMAND SIGNAL |

SYSTEM OF CONTROLLING STEAM GENERATOR LEVEL DURING MAIN FEED-WATER CONTROL VALVE TRANSFER FOR NUCLEAR POWER PLANT

CROSS-REFERENCE TO RELATED PATENT APPLICATION

This application claims the benefit of Korean Patent Application No. 10-2010-0138442, filed on Dec. 30, 2010, in the Korean Intellectual Property Office, the disclosure of which is incorporated herein in its entirety by reference.

BACKGROUND OF THE INVENTION

1. Field of the Invention

The present invention relates to a system of controlling a level of main feed-water in a steam generator of a nuclear power plant during a main feed-water control valve transfer to prevent an excessive level of the main feed-water in the steam generator.

2. Description of the Related Art

A nuclear power plant generally includes 100 or more systems respectively having individual functions. The systems are greatly classified into a nuclear steam supply system (NSSS) which is based on a nuclear reactor, a turbine/generator system which is supplied with steam to operate a generator so as to produce electricity, and other subordinate facilities. A pressurized water reactor (PWR), which is currently a main part of the nuclear power plant, includes a primary system which is based on a reactor, a secondary system which includes a steam generator, a turbine, an electric generator, and a condenser, an engineered safeguard system which is prepared for accidents, a power transmission and supply system, an instrumentation and control system, other subsidiary systems.

Hot water generated in a reactor circulates through a heat transfer pipe of a steam generator, which is connected to the reactor through a coolant pipe, to transfer heat to feed-water flowing into the steam generator through another pipe and then returns to the reactor. For the easy performance of this function of the steam generator, a level of the feed-water in the steam generator should be appropriately maintained. A feed-water control system of a nuclear power plant uniformly controls the level of the feed-water in the steam generator.

SUMMARY OF THE INVENTION

The present invention provides a system of controlling main feed-water by which a gain and an integral time constant of a proportional-integral (PI) controller are transformed according to a timer lapse time to relieve an excessive level of feed-water in a steam generator caused by sudden changes in open degrees of a downcomer feed-water valve and an economizer feed-water valve when reactor power transfers between low and high power sections.

According to an aspect of the present invention, there is provided a system for controlling a main feed-water pump and a main feed-water control valve including a downcomer feed-water valve and an economizer feed-water valve to control a steam generator level of a nuclear power plant, including: a proportional-integral (PI) controller which performs a PI operation on a compensated steam generator error signal generated according to a deviation between the steam generator level and level setpoints of the steam generator and generates a flow demand signal according to the result of the PI operation; a power determiner which determines a power section to which reactor power belongs, among low and high power sections and determines a transfer time when the determined power section transfers; a main feed-water controller which generates a main feed-water control signal for controlling the main feed-water pump and the main feed-water control valve according to the flow demand signal and the determined power section; an information provider which provides PI information including a gain and an integral time constant set according to the reactor power; and an information transformer which provides the PI information to the PI controller and provides transformed PI information comprising a transformed gain and a transformed integral time constant to the PI controller only for a predetermined timer time at the transfer time.

The information transformer may include: a transformation information provider which provides the transformed gain and the transformed integral time constant to the PI controller; and a first timer which provides the PI information to the PI controller and provides the transformed PI information to the PI controller only for a predetermined first timer time at a first transfer time when the transfer time transfers from the low power section to the high power section.

The transformed gain may be set to a value greater than a gain set according to the reactor power, and the transformed integral time constant may be set to a value smaller than an integral time constant set according to the reactor power.

The transformed gain and the transformed integral time constant may vary with the timer time.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. Like reference numerals in the drawings denote like elements, and thus their description will be omitted.

The present invention provides a system and a method of controlling an excessive level of feed-water in a steam generator of a nuclear power plant during a main feed-water control valve transfer.

Figure 1:
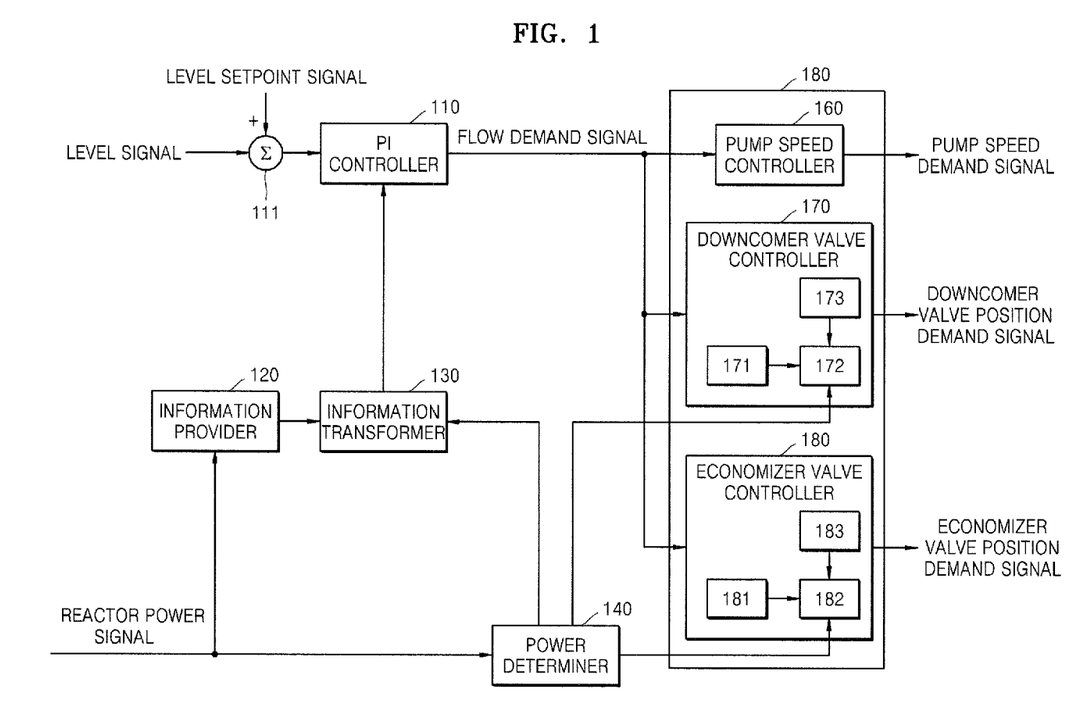
FIG. 1 is a view illustrating a system for controlling a level of main feed-water in a steam generator of a nuclear power plant according to an embodiment of the present invention.

FIG. 1 is a view illustrating a system 100 for controlling a level of main feed-water in a steam generator of a nuclear power plant according to an embodiment of the present invention.

Referring to FIG. 1, the system 100 includes a proportional-integral (PI) controller 110, an information provider 120, an information transformer 130, a power determiner 140, and a main feed-water controller 150.

The PI controller 110 performs a PI control with respect to a compensated steam generator level error signal of a steam generator and generates a flow demand signal according to the result of the PI control. As will be described later, a proportional gain and an integral time constant used by the PI controller 110 are provided from the information provider 120 and the information transformer 130.

The system 100 of the nuclear power plant may further include an error signal provider 111 which is installed in front of the PI controller 110 and provides the compensated steam generator level error signal. The error signal provider 111 receives a difference between a level signal corresponding to a steam generator level and a level setpoint signal corresponding to a steam generator level setpoint and provides the compensated steam generator level error signal, which is the difference between the level signal and the level setpoint signal, to the PI controller 110.

The flow demand signal generated by the PI controller 110 is provided to the main feed-water controller 150. The main feed-water controller 150 generates a main feed-water control signal for controlling a main feed-water pump and a main feed-water control valve based on the flow demand signal.

The main feed-water control signal includes at least one of a pump speed demand signal, a downcomer valve position demand signal, and an economizer valve position demand signal. In the present invention, the main feed-water control valve includes a downcomer feed-water valve and an economizer feed-water valve.

The downcomer feed-water valve is a valve which controls a position and an open degree of the downcomer feed-water valve. The economizer feed-water valve is a valve which controls a position and an open degree of the economizer feed-water valve.

Therefore, the main feed-water controller 150 generates the pump speed demand signal, the downcomer valve position demand signal, and the economizer valve position demand signal based on the flow demand signal.

For this purpose, the main feed-water controller 150 includes a pump speed controller 160 which controls the speed of the main feed-water pump, a downcomer valve controller 170 which controls the position of the downcomer feed-water valve, and an economizer valve controller 180 which controls the position of the economizer feed-water valve.

The pump speed controller 160 generates the pump speed demand signal for controlling the speed of the man feed-water pump. The downcomer valve controller 170 generates the downcomer valve position demand signal for controlling the open degree of the downcomer feed-water valve. The economizer valve controller 180 generates the economizer valve position demand signal for controlling the open degree of the economizer feed-water valve. The speed of the main feed-water pump, the position of the downcomer feed-water valve, and the position of the economizer feed-water valve are respectively controlled by the pump speed demand signal, the downcomer valve position demand signal, and the economizer valve position demand signal, thereby controlling the level of the feed-water in the steam generator.

The main feed-water controller 150 changes its control method according to a power section of reactor power and a transfer time of the power section. A reference point of the power section and the transfer time of the reactor power is a point at which the reactor power is about 20%. If the reactor power belongs to a low power section of about 20% or less, the main feed-water controller 150 controls the main feed-water control valve in a low power control mode. If the reactor power belongs to a high power section of about 20% or more, the main feed-water controller 150 controls the main feed-water control valve in a high power control mode.

The power determiner 140 receives a reactor power signal corresponding to the reactor power and determines a power section to which the reactor power belongs and the transfer time when the power section of the reactor power transfers. A power section signal of the power section of the reactor power determined by the power determiner 140 is provided to the main feed-water controller 150. A transfer signal generated at the transfer time when the power section of the reactor power transfers is provided to the information transformer 130.

As described above, in the present invention, a control method of the main feed-water controller 150 is changed according to the reactor power. In other words, a flow and a distribution ratio of feed-water supplied through a downcomer and an economizer are controlled according to the reactor power.

Since the main feed-water pump operates at the lowest speed in the low power section in which the reactor power is about 20% or less, an actual feed-water flow control function in the low power section is performed by the downcomer feed-water valve. In other words, in the low power section in which the reactor power is about 20% or less from a start operation, all amount of feed-water is supplied to the steam generator only through a downcomer feed-water nozzle.

In the high power section in which the reactor power is about 20% or more, the position of the downcomer feed-water valve is fixed to a position in which a feed-water flow corresponding to about 10% of a total feed-water flow (a feed-water flow if the reactor power is 100%) can pass. Also, the position of the economizer feed-water valve is controlled to supply a remaining feed-water flow to the steam generator through the economizer.

Accordingly, the downcomer feed-water valve and the economizer feed-water valve are controlled to be automatically transferred at a point at which the reactor power is about 20%. If the reactor power reaches a point at which the reactor power decreases and is about 20%, the economizer feed-water valve is controlled to be completely closed and to supply feed-water to the steam generator only through the downcomer. Also, if the reactor power reaches a point at which the reactor power increases and is about 20%, the position of the downcomer feed-water valve is rapidly changed to a valve position corresponding to about 10% of the feed-water flow required during a 100% power operation. Simultaneously with this, the economizer feed-water valve is controlled to supply the remaining feed-water flow to the steam generator.

A reference point for dividing the power section of the reactor power is not limited to the above-described reference point but may be determined using various methods. The reference point for dividing the power section of the reactor power may be set to 20% as described above. However, as in the following example, a reference point when the reactor power increases and a reference point when the reactor power decreases may be differently set.

For example, if the reactor power increases, a reference point for dividing the power section of the reactor power into low and high power sections may be set to a point when the reactor power is about 20%. If the reactor power decreases, the reference point may be set to a point when the reactor power is about 18%. In this case, if the reactor power increases, the point when the reactor power is about 20% is a transfer time when the low power section transfers to the high power section. If the reactor power decreases, the point when the reactor power is about 18% is a transfer time when the high power section transfers to the low power section.

Figure 2:
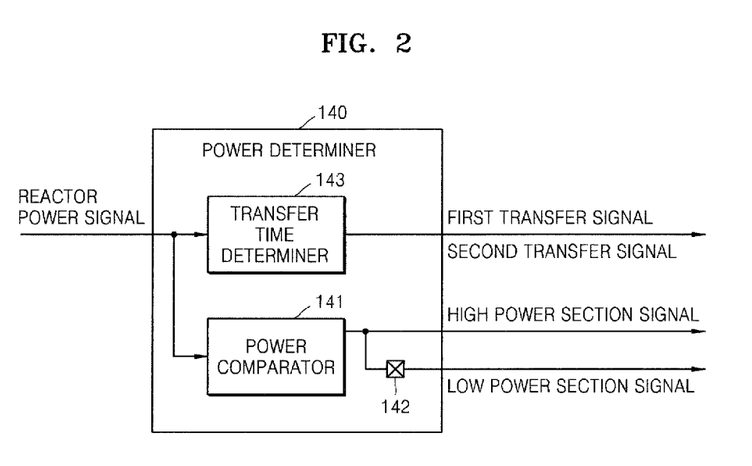
FIG. 2 is a view illustrating a power determiner in detail.

FIG. 2 is a view illustrating the power determiner 140 in detail.

Referring to FIG. 2, the power determiner 140 includes a power comparator 141 and a transfer time determiner 143.

The power comparator 141 receives a reactor power signal corresponding to the reactor power, determines a power section of current reactor power based on the reactor power signal, and generates a power section signal of the determined power section. The power section of the reactor power means one of low and high power sections to which the current reactor power belongs.

If the reactor power is lower than about 20% based on a point of about 20%, the power comparator 141 determines the power section of the reactor power as the low power section, generates a low power section signal TL, and provides the low power section signal TL to the economizer valve controller 180. If the reactor power is higher than or equal to 20% based on the point of about 20%, the power comparator 141 determines the power section of the reactor power as the high power section, generates a high power section signal TH, and provides the high power section signal TH to the downcomer valve controller 170.

The transfer time determiner 143 generates a first transfer signal TLH at a first transfer time when the reactor power transfers from the low power section to the high power section and provides the first transfer signal TLH to the information transformer 130. The transfer time determiner 143 also generates a second transfer signal THL at a second transfer time when the reactor power transfers from the high power section to the low power section and provides the second transfer signal THL to the information transformer 130.

A reference point for dividing the power section of the reactor power into the low and high power sections is a point when the reactor power is about 20%. However, as described above, the reference point may be differently set when the reactor power increases and when the reactor power decreases.

The description will return to FIG. 1.

The pump speed controller 160 receives the flow demand signal and generates the pump speed demand signal for controlling the speed of the main feed-water pump based on the flow demand signal. The pump speed demand signal is provided to the main feed-water pump to be used to control a feed-water speed of the main feed-water pump.

The downcomer valve controller 170 receives the flow demand signal and the high power section signal TH and generates the downcomer valve position demand signal for controlling the position of the downcomer feed-water valve based on the flow demand signal and the high power section signal TH. The downcomer feed-water valve controls the position thereof according to the downcomer valve position demand signal to control the open degree thereof.

The downcomer valve controller 170 includes a downcomer distributer 171, a first transfer logic 172, and a downcomer fixer 173.

The downcomer distributer 171 calculates a feed-water flow, which is supplied through the downcomer, according to the flow demand signal.

If the reactor power is in the high power section, the downcomer fixer 173 provides a bias signal to the first transfer logic 172. The bias signal refers to a signal which is to fix the position of the downcomer feed-water valve to supply the feed-water flow corresponding to about 10% of the total feed-water flow (the feed-water flow if the reactor power is 100%) through the downcomer.

If the first transfer logic 172 receives the high power section signal TH from the power determiner 140, the first transfer logic 172 generates the downcomer valve position demand signal which is to fix the position of the downcomer feed-water valve to supply the feed-water flow corresponding to about 10% of the feed-water flow during the 100% power operation according to the bias signal of the downcomer fixer 173. If the first transfer logic 172 does not receive the high power section signal TH, the first transfer logic 172 generates the downcomer valve position demand signal to supply feed-water through the downcomer according to the flow demand signal.

Accordingly, in the low power section, the downcomer valve controller 170 controls the total feed-water flow to be supplied through the downcomer according to the flow demand signal. In the high power section, the downcomer valve controller 170 controls a feed-water flow corresponding to about 10% of the total feed-water flow during the 100% power operation to be supplied through the downcomer.

The economizer valve controller 180 includes an economizer distributer 181, a second transfer logic 182, and a closed fixer 183.

The economizer distributer 181 calculates the feed-water flow supplied through the economizer according to the flow demand signal.

If the reactor power is in the low power section, the closed fixer 183 provides a closed signal to the second transfer logic 182. The closed signal refers to a signal which is to fix the position of the economizer feed-water valve to a closed position so that feed-water is not at all supplied through the economizer.

If the second transfer logic 182 receives the low power section signal TL from the power determiner 140, the second transfer logic 182 generates the economizer valve position demand signal which is to fix the position of the economizer feed-water valve to close the economizer feed-water valve according to the closed signal. If the second transfer logic 182 does not receive the low power section signal TL, the second transfer logic 182 generates the economizer valve position demand signal to supply feed-water through the economizer according to the flow demand signal.

Accordingly, in the low power section, the economizer valve controller 180 controls the economizer feed-water valve to be closed. In the high power section, the economizer valve controller 180 controls the remaining feed-water flow to be supplied through the economizer except for the feed-water flow of the total feed-water flow supplied through the downcomer.

Figure 3:
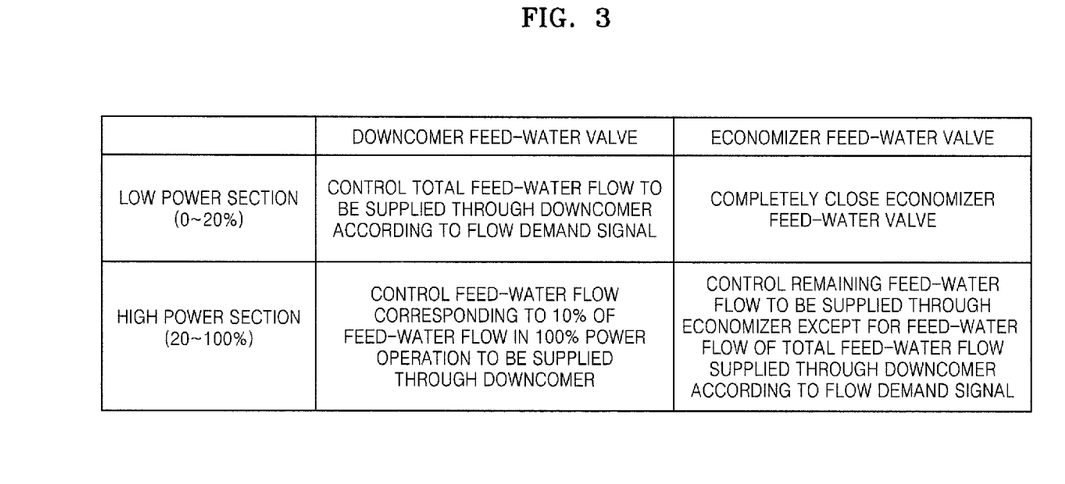
FIG. 3 is a table illustrating a ratio of feed-water which is distributed through a downcomer feed-water valve and an economizer feed-water value according to a power section of a reactor.

FIG. 3 is a table illustrating a ratio of feed-water which is distributed through the downcomer feed-water valve and the economizer feed-water valve according to the power section of the reactor.

Referring to FIG. 3, a feed-water flow is distributed through the downcomer feed-water valve and the economizer feed-water valve according to the power section of the reactor.

Figure 4:
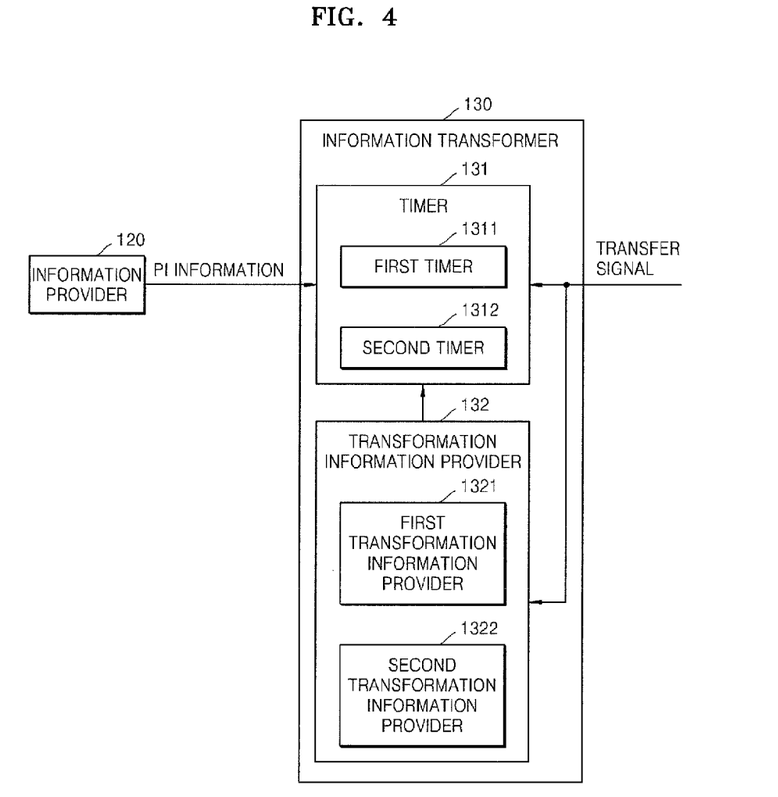
FIG. 4 is a view illustrating an information provider and an information transformer in detail.

FIG. 4 is a view illustrating the information provider 120 and the information transformer 130 in detail.

The information provider 120 provides PI information comprising the gain and the integral time constant, which are set according to the reactor power, to the PI controller 110. For this purpose, the information provider 120 receives the reactor power signal corresponding to the reactor power and provides information regarding the gain and the integral time constant, which are set based on the reactor power signal, to the PI controller 110.

Figure 5:
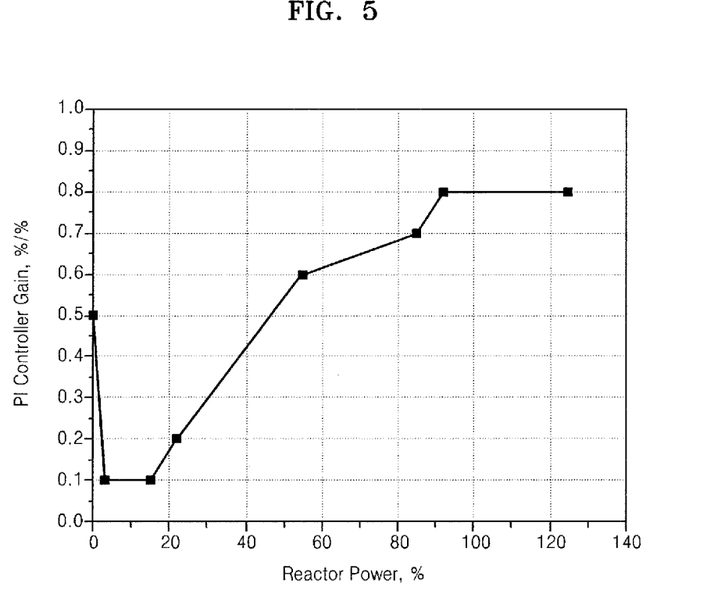
FIGS. 5 and 6 are graphs respectively illustrating a gain and an integral time constant which are preset based on a reactor power signal.
Figure 6:
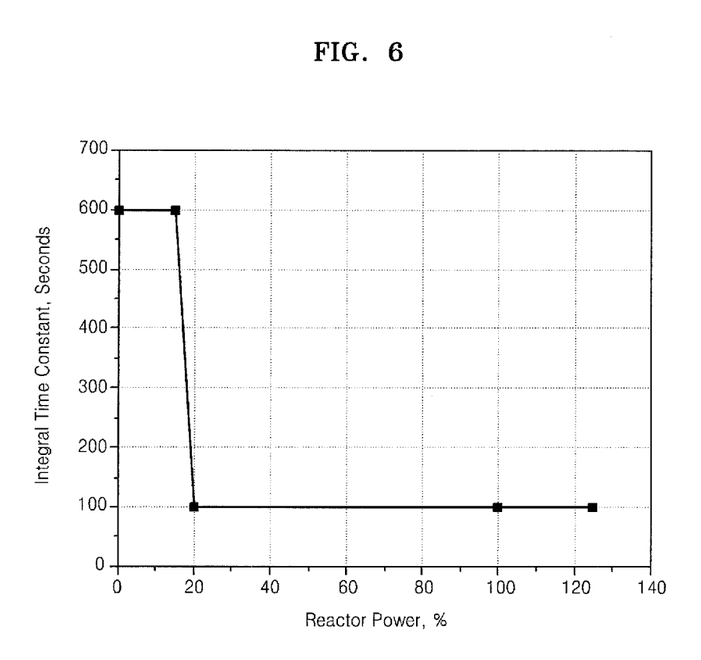

FIGS. 5 and 6 are graphs respectively illustrating the gain and the integral time constant set based on the reactor power signal.

Referring to FIGS. 5 and 6, the gain and the integral time constant of the PI controller 110 are optimal setpoints for preventing several excessive phenomena which may occur in full power. In low power, the gain is low, and the integral time constant is relatively high.

At the second transfer time when the reactor power transfers from the high power section to the low power section, the economizer feed-water valve is completely closed. Also, the downcomer feed-water valve, which is fixed to a valve position corresponding to a feed-water flow of about 10% of a demand flow during the 100% reactor power operation, rapidly rises to a valve position corresponding to a flow demand signal of 20% reactor power. Therefore, an excessive phenomenon in which the level of the steam generator rapidly increases may occur.

Figure 7:
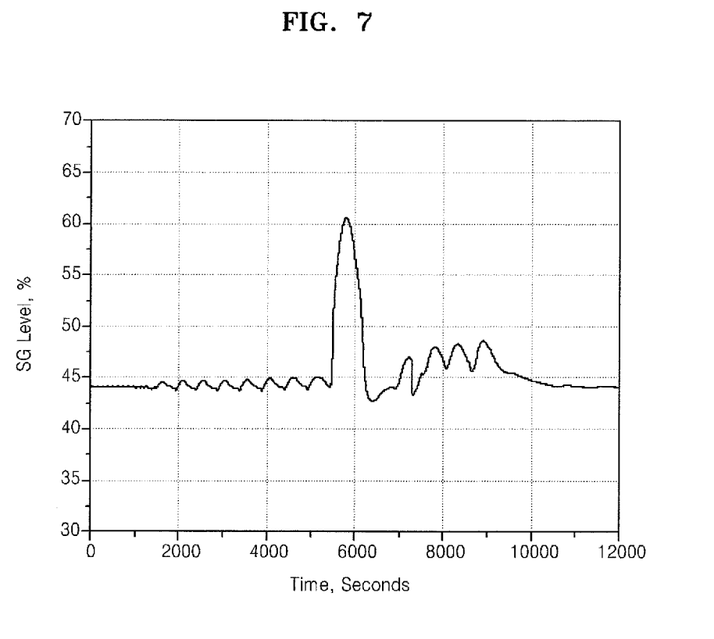
FIG. 7 is a graph illustrating changes in a level of feed-water in a steam generator at a second transfer time when reactor power transfers from a high power section to a low power section.

FIG. 7 is a graph illustrating changes in the steam generator level at the second transfer time when the reactor power transfers from the high power section to the low power section.

Referring to FIG. 7, an excessive phenomenon in which the steam generator level rises from 44% to 61%, i.e., by about 15%, at the second transfer time, occurs, wherein 44% corresponds to a normal level. Some nuclear power plants manually control downcomer feed-water valves due to an excessive rise of a level of a steam generator at a second transfer time to prevent a reactor from stopping due to a high level of a steam generator. Examples of manual operations increasing burden on an operator have been recently frequently reported.

Figure 8:
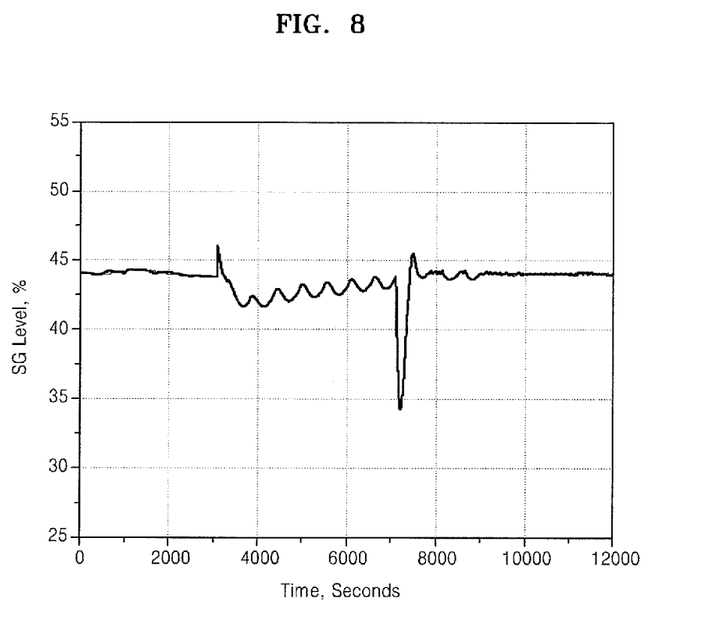
FIG. 8 is a graph illustrating changes in the level of the feed-water in the steam generator at a first transfer time when the reactor power transfers from the low power section to the high power section.

FIG. 8 is a graph illustrating changes in the steam generator level at the first transfer time when the reactor power transfers from the low power section to the high power section.

At the first transfer time when the reactor power transfers from the low power section to the high power section, the downcomer feed-water valve rapidly transfers to the valve position corresponding to the feed-water flow of about 10% of the demand flow during the 100% reactor power operation, and the economizer feed-water valve rapidly moves to the valve position corresponding to the flow demand signal of the 20% reactor power. Since the downcomer feed-water valve rapidly transfers, the steam generator level decreases on an initial stage and then increases due to rapid opening of the economizer feed-water valve.

Referring to FIG. 8, the excessive phenomenon in which the feed level of the steam generator decreases from 44% to 34%, i.e., by about 10%, at the first transfer time occurs, wherein 44% corresponds to a normal level of the steam generator. At the first transfer time, the open degree of the downcomer feed-water valve variously appears according to a pressure of the steam generator. Therefore, since the economizer feed-water valve rapidly opens after a valve transfer, the reactor may stop due to the high level of the steam generator.

However, since the system 100 has a relatively slow response characteristic under the low gain and the high integral time constant of the PI controller 110, it may be difficult to relieve the excessive phenomenon of the steam generator level.

Accordingly, if the main feed-water control valve transfers, it is necessary to prevent the excessive phenomenon of the steam generator level in order to relieve the burden on the operator due to the excessive phenomenon of the steam generator level and reduce the possibility of the stop of the reactor.

The description will return to FIG. 4.

The information transformer 130 provides transformed PI information, which includes information regarding a transformed gain and a transformed integral time constant, to the PI controller 110 only for a predetermined timer time at a transfer time of the power section of the reactor power.

The information transformer 130 includes a timer 131 and a transformation information provider 132.

When the timer 131 receives a transfer signal from the power determiner 140, the timer 131 provides the transformed PI information to the PI controller 110 only for the predetermined timer time. After the predetermined timer time has elapsed, the timer 131 provides the gain and the integral time constant, which are provided from the information provider 120, to the PI controller 110.

Since the timer time and the transformed PI information may be differently set at the first and second transfer times, the timer 131 includes first and second timers 1311 and 1312.

When the first timer 1311 receives a first transfer signal from the power determiner 140, the first timer 1311 provides the transformed PI information to the PI controller 110 only for a predetermined first timer time. After the predetermined first timer time has elapsed, the first timer 1311 provides the gain and the integral time constant, which are provided from the information provider 120, to the PI controller 110.

When the second timer 1312 receives a second transfer signal from the power determiner 140, the second timer 1312 provides the transformed PI information to the PI controller 110 only for a predetermined second timer time. After the predetermined second timer time has elapsed, the second timer 1312 provides the gain and the integral time constant, which are provided from the information provider 120, to the PI controller 110.

In other words, the first and second timers 1311 and 1312 provide the gain and the integral time constant, which are provided from the information provider 120, to the PI controller 110, and if the transfer signal is received, provide the transformed PI information to the PI controller 110 only for the predetermined timer time.

The transformation information provider 132 provides the transformed gain and the transformed integral time constant. Since the transformed PI information may be differently set at the first and second transfer times, the transformation information provider 132 includes first and second transformation information providers 1321 and 1322.

The gain and the integral time constant provided from the information provider 131 are values which are preset to vary according to the reactor power. However, the transformed gain and the transformed integral time constant provided from the transformation information provider 132 are values which are preset to vary with time not the reactor power.

Figure 9:
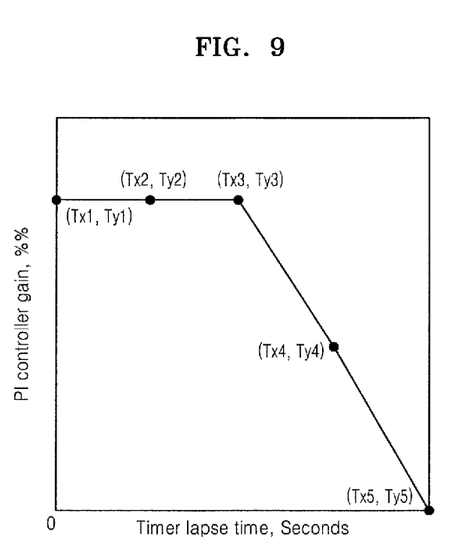
FIGS. 9 and 10 are graphs respectively illustrating a transformed gain and a transformed integral time constant with respect to a timer lapse time.
Figure 10:
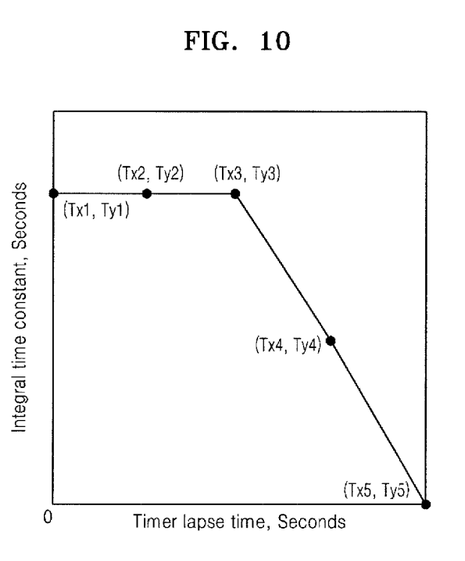

FIGS. 9 and 10 are graphs respectively illustrating the transformed gain and the transformed integral time constant with respect to a timer lapse time.

Only when the timer 131 having a fixed constant (variable) time operates, the transformed gain and the transformed integral time constant shown in FIGS. 9 and 10 are provided to the PI controller 110. After the operation of the timer 131 is completed, the gain and the integral time constant provided from the information provider 120 are provided to the PI controller 110. This logic is applied only for a constant timer time of the timer 131 at the transfer time, and operation conditions of the timer 131 are limited only to a moment when the downcomer feed-water valve and the economizer feed-water valve reach transferred power (reactor power corresponding to about 20%).

The transformed gain, the transformed integral time constant, and the timer time are not limited to the embodiment of the graphs of FIGS. 9 and 10 but may be appropriately set to control increase and decrease degrees of the steam generator level at the transfer time.

Figure 11:
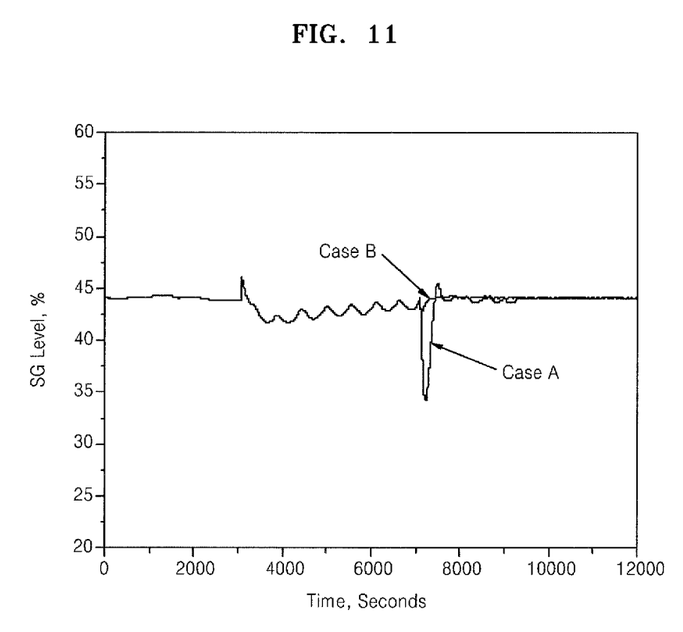
FIGS. 11 and 12 are graphs respectively illustrating effects of the present invention at first and second transfer times.
Figure 12:
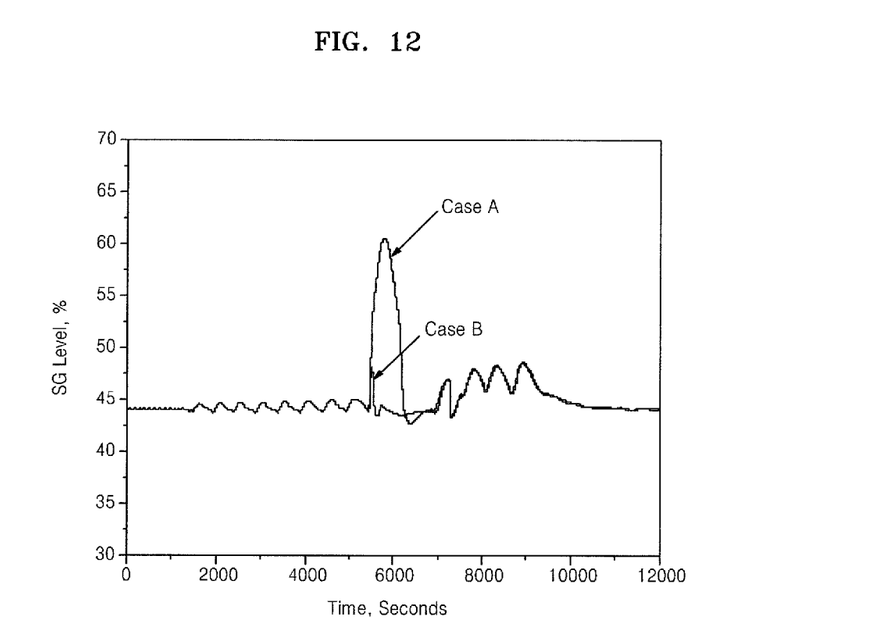

FIGS. 11 and 12 are graphs respectively illustrating effects of the present invention at the first and second transfer times.

In FIGS. 11 and 12, Case A is a graph illustrating changes in the feed-watwer level of the steam generator when the information provider 120 provides the PI information comprising the gain and the integral time constant to the PI controller 110. And Case B is a graph illustrating changes in the feed-watwer level of the steam generator when the information transformer 130 provides the transformed PI information comprising the transformed gain and the transformed integral time constant to the PI controller 110 only for a predetermined timer time at the transfer time.

Referring to FIGS. 11 and 12, increases and decreases in the steam generator level at the first and second transfer times are rapidly coped with to relieve the excessive phenomenon of the steam generator level in the case B. Therefore, the possibility of the stop of the reactor caused by an excessive change in the steam generator level at the transfer time is reduced to relieve the burden on the operator and improve an operation rate and economic feasibility of the nuclear power plant.

As described above, according to the present invention, an excessive phenomenon of a level of a steam generator is relieved at a transfer time of reactor power between low and high power sections. Therefore, a possibility of the stop of a reactor caused by the excessive phenomenon of the steam generator level is reduced to relieve burden on an operator and improve an operation rate and economic feasibility of a nuclear power plant.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A system for controlling a main feed-water pump and a main feed-water control valve including a downcomer feed-water valve and an economizer feed-water valve to control a steam generator level of a nuclear power plant, comprising:
    a proportional-integral (PI) controller which performs a PI operation on a compensated steam generator error signal generated according to a deviation between the steam generator level and level setpoints of the steam generator and generates a flow demand signal according to the result of the PI operation;
    a power determiner which determines a power section to which reactor power belongs, among low and high power sections and determines a transfer time when the determined power section transfers;
    a main feed-water controller which generates a main feed-water control signal for controlling the main feed-water pump and the main feed-water control valve according to the flow demand signal and the determined power section;
    an information provider which provides PI information comprising a gain and an integral time constant set according to the reactor power; and
    an information transformer which provides the PI information to the PI controller and provides transformed PI information comprising a transformed gain and a transformed integral time constant to the PI controller only for a predetermined timer time at the transfer time,
    wherein the transformed gain and the transformed integral time constant are preset to vary with the timer time.

2. The system of claim 1, wherein the information transformer comprises:
    a transformation information provider which provides the transformed gain and the transformed integral time constant to the PI controller; and
    a first timer which provides the PI information to the PI controller and provides the transformed PI information to the PI controller only for a predetermined first timer time at a first transfer time when the transfer time transfers from the low power section to the high power section.

3. The system of claim 2, wherein the information transformer comprises:
    a second timer which provides the PI information to the PI controller and provides the transformed PI information to the PI controller only for a predetermined second timer time at a second transfer time when the transfer time transfers from the low power section to the high power section.

4. The system of claim 1, wherein the transformed gain is set to a value greater than a gain set according to the reactor power, and the transformed integral time constant is set to a value smaller than an integral time constant set according to the reactor power.

* * * * *